United States Patent

Pieterse et al.

[11] Patent Number: 6,080,064
[45] Date of Patent: *Jun. 27, 2000

[54] DEVICE FOR PLAYING GAMES VIA A COMMUNICATIONS NETWORK, AND A GAME SYSTEM USING A COMMUNICATIONS NETWORK

[75] Inventors: Rob Pieterse, Aerdenhout; Mark Albert Pors, Zoetermeer; Martin Klaas De Lange, Voorburg; Frank Pieter Van Pomeren, Delft; Johan Van Tilburg, Zoetermeer, all of Netherlands

[73] Assignee: Koninklijke PTT Nederland N.V., Netherlands

[*] Notice: This patent is subject to a terminal disclaimer.

[21] Appl. No.: 08/841,145

[22] Filed: Apr. 24, 1997

Related U.S. Application Data

[63] Continuation-in-part of application No. 08/638,243, Apr. 26, 1996, Pat. No. 5,714,741.

[30] Foreign Application Priority Data

Oct. 24, 1996 [EP] European Pat. Off. .............. 96202967

[51] Int. Cl.[7] ........................................................ A63F 9/24
[52] U.S. Cl. ................................................................ 463/42
[58] Field of Search .................................... 463/1, 30, 36, 463/37, 38, 39, 40, 41, 42; 364/410.1, 411.1; 380/4, 25; 273/148 B; 345/156, 161, 163; 379/90.01, 91.01, 93.12, 93.13, 93.26, 110.01, 102.01, 102.03, 428, 434, 436, 441, 457; 235/375, 379, 380, 382.5, 382; 340/825, 825.31, 825.33, 825.34; 700/91–92

[56] References Cited

U.S. PATENT DOCUMENTS

| | | |
|---|---|---|
| 4,786,768 | 11/1988 | Langewis et al. . |
| 4,882,474 | 11/1989 | Anderl et al. . |
| 5,014,125 | 5/1991 | Pocock et al. ........................ 379/105 |
| 5,034,574 | 7/1991 | Martovitz .......................... 273/148 B |
| 5,189,287 | 2/1993 | Parienti . |
| 5,208,446 | 5/1993 | Martinez . |
| 5,221,838 | 6/1993 | Gutman et al. . |
| 5,236,199 | 8/1993 | Thompson, Jr. . |
| 5,247,578 | 9/1993 | Pailles et al. . |
| 5,335,276 | 8/1994 | Thompson et al. . |
| 5,341,421 | 8/1994 | Ugon . |
| 5,343,219 | 8/1994 | DuBosque, Jr. ..................... 273/148 B |
| 5,359,182 | 10/1994 | Schilling .............................. 235/382.5 |
| 5,485,510 | 1/1996 | Colbert . |
| 5,714,741 | 2/1998 | Pieterse et al. ......................... 235/380 |

FOREIGN PATENT DOCUMENTS

| | | |
|---|---|---|
| 0 451 288 | 10/1991 | European Pat. Off. . |
| 602840 A1 | 6/1994 | European Pat. Off. . |
| 0 637 004 | 2/1995 | European Pat. Off. . |
| 43 26 735 | 2/1995 | Germany . |
| 62-043943 | 2/1987 | Japan . |
| 8-179742 | 7/1996 | Japan . |
| 2120507A | 11/1983 | United Kingdom . |
| 2136303 | 9/1984 | United Kingdom . |
| WO 91/07042 | 5/1991 | WIPO . |
| WO 94/28498 | 12/1994 | WIPO . |
| WO 95/04328 | 2/1995 | WIPO . |

OTHER PUBLICATIONS

Translation of JP62–043943 by FLS, Inc, 27 pages in total.

*Primary Examiner*—Mark A. Sager
*Attorney, Agent, or Firm*—Michaelson & Wallace; Peter L. Michaelson

[57] ABSTRACT

A pointing device (1), such as a joystick, is provided comprising an integrated Dual Tone Multiple Frequency (DTMF) generator (104) for generating DTMF pointing signals in response to movements of a tiltable stick (12). Preferably, the pointing device (1) also comprises a card reader/writer (106) operatively connected with the DTMF generator (104) by means of a control device (101) for exchanging smart card commands as DTMF signals. A device according to the invention allows games to be remotely played, a smart card (2) being used to pay for the games and/or to collect prizes via a telephone network.

6 Claims, 6 Drawing Sheets

DEVICE FOR PLAYING GAMES VIA A COMMUNICATIONS NETWORK, AND A GAME SYSTEM USING A COMMUNICATIONS NETWORK

CROSS-REFERENCE TO RELATED APPLICATION

This application is a continuation-in-part application of our co-pending U.S. patent application Ser. No. 08/638,243; filed Apr. 26, 1996 and entitled "A Device for Transparent Interaction Between an IC Card and a Remote Terminal" now U.S. Pat. No. 5,714,741.

BACKGROUND OF THE INVENTION

The present invention relates to a device for playing games or otherwise influencing events via a communications network. More in particular, the present invention relates to a pointing device, such as a joystick, which enables interaction with a game server via a telephone network, and which preferably also allows payments to be made.

Pointing devices, such as joysticks, are well known computer peripherals. A joystick allows figures (or a cursor) to move over the screen of the computer. It is also known in practice to use the screen of a television set, the joystick being connected to, e.g., a game computer which is, in turn, connected to the television set. A disadvantage of such an arrangement is that it requires the user to have a games computer at his disposal. Other systems are known which allow the remote playing of games via a telephone network and do not require the user to have a games computer, as the game is being played on a central games computer.

U.S. Pat. No. 5,236,199, incorporated by reference in this text, discloses a system in which the keypad of a telephone set is used to provide directional information transmitted as Dual Tone Multiple Frequency (hereinafter referred to as DTMF) signals. This directional information is processed and is displayed by a television set. Although such a system allows the remote playing of video games, the handling of the telephone keypad is felt to be unnatural and clumsy.

U.S. Pat. No. 4,786,768 discloses a joystick for use with a computer keyboard. The movement of the joystick results in keys of the keypad being depressed, thus allowing a more natural and handy way of directing an object (e.g. cursor) than by using keys of the keypad. This reference does not suggest to use the joystick in conjunction with a telephone set.

Japanese Patent Application JP 8-179,742 discloses a system in which cursor information produced by a so-called mouse is converted into DTMF signals which are multiplexed which voice signals and transmitted over a telephone line. However, for playing games, a joystick is more practical than a mouse.

U.S. Pat. No. 5,341,421, also incorporated by reference in this text, discloses a pointing device comprising a track ball for use with a computer. In conjunction with a smart card, this Prior Art pointing device may be used as a security device for, e.g., gaining access to protected computer files. A similar combined security and pointing device, constituted by a mouse provided with a smart card reader, is disclosed in German Patent Application DE 4,326,735. These Prior Art devices are not suited for the remote playing of games via a telephone network.

There is thus a need for a pointing device, shaped like a joystick, which allows games to be played via a telephone network. In addition, there is a need for handling financial transactions via a telephone network in order to allow a player to pay for a game or, conversely, to cash prize money.

SUMMARY OF THE INVENTION

It is an object of the invention to overcome the abovementioned and other disadvantages of the Prior Art and to provide a pointing device which allows games to be played via a public communications line, such as a telephone line, without the need for a computer at the location of the player.

It is another object of the present invention to provide a pointing device which allows financial transactions, e.g., to pay for the games played or to receive payments in the case of games won.

It is a further object of the present invention to provide a pointing device which allows use of a single communications channel for both the game proper and the financial transactions involved.

It is a still further object of the present invention to provide a pointing device which allows a quick and efficient communication with a remote device, such as a server.

To these and other ends, the present invention provides a pointing device, comprising means for generating pointing signals in response to pointing means being activated by a user, and a DTMF interface for generating DTMF signals in response to the pointing signals. The DTMF interface (DTMF generator and, optionally, DTMF receiver) offers the possibility of communicating over a telephone line without the need for an additional computer.

Preferably, the means for generating pointing signals comprise first activating means mechanically connected with the pointing means, second activating means mechanically connected with one or more keys, and control means for processing pointing signals. In addition to the first pointing means, which may be constituted by, e.g., a joystick or a track ball, keys are provided. This allows for additional functions. The activating means preferably provide a mapping of the keys of a telephone set. That is, the activating means correspond with the keys of a telephone set where the keys "1" through "4" and "6" through "9" may be used to indicate different directions relative to the "5" key, the "5" key being used asb "Fire" key. The keys "*","0" and "#" may be used for additional functions, such as "Start", "Stop" and "Hold".

Advantageously, the pointing device of the present invention further comprises a card reader/writer for exchanging data with a smart card. The card reader/writer is preferably coupled with the telephone line via the control means and the DTMF interface. Such a pointing device allows to play and pay over the same channel, i.e. over the same telephone line, even allowing financial transactions simultaneously with the playing of the game.

Advantageously, the pointing device of the invention is arranged for communicating with a server on a first level and with the smart card on a second level, each level involving a different effective data rate. This allows an efficient and fast data exchange with the smart card, thereby causing the least interference with the game.

The invention further provides a system for remote entertainment, comprising a pointing device as described above, a telephone set for dialing a server, the device and the telephone set being connected with a communications network, the server being connected with the communications network via a modem, the server comprising means for producing and transmitting video data, a television set having means for receiving video data, said video data being dependent on direction data produced by the pointing device and transmitted as DTMF signals over the network.

It should be noted that U.S. Pat. No. 5,341,421 discloses a computer peripheral having a track ball and a card reader. The track ball is used as a pointing device, i.e. as a "mouse", while the card reader is used as a security device for providing access to the computer. The use of this known device for remotely playing video games, e.g. via a telephone network, is not disclosed. Neither is there any interoperability between the card reader and the track ball.

EXEMPLARY EMBODIMENTS

Figure 1:
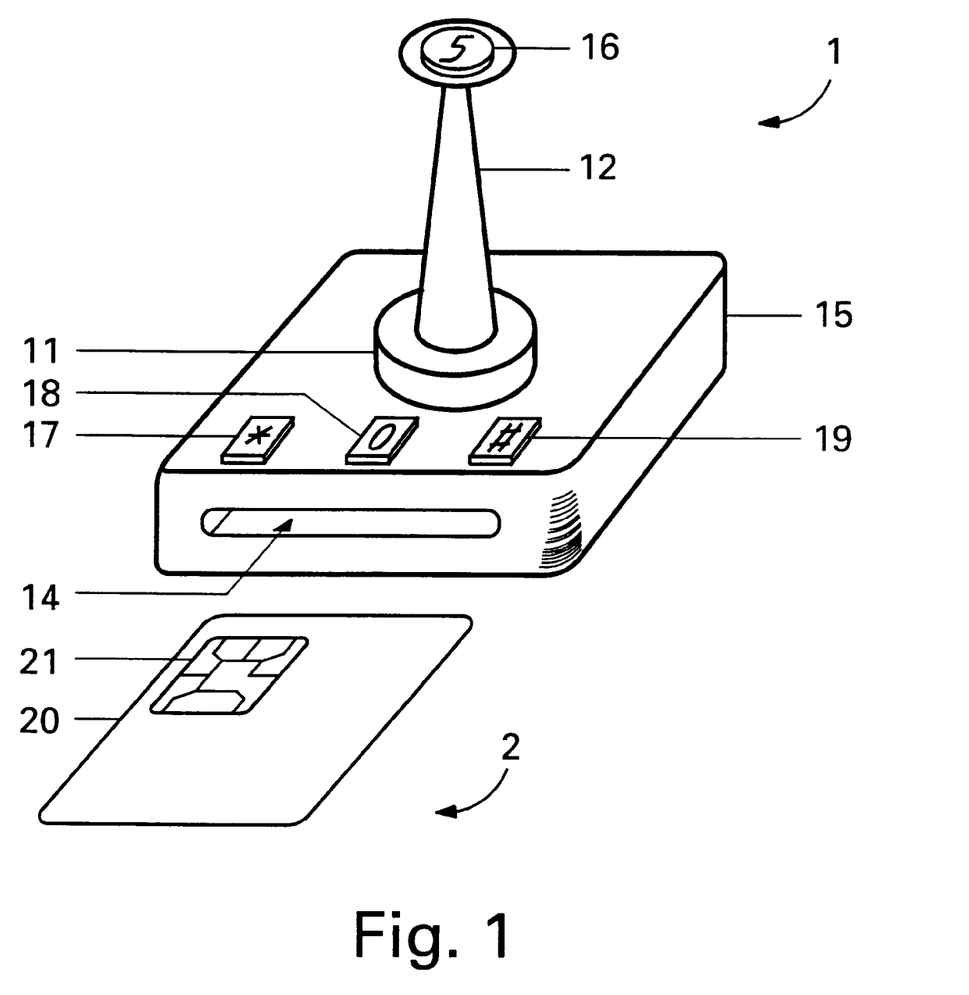
FIG. 1 shows in perspective a pointing device according to the present invention.

The embodiment of the pointing device of the invention shown by way of example in FIG. 1 comprises a body 15. A pointing means (joystick proper) 12 is hingedly connected with the body 15 via a bearing 11 so as to allow the pointing means 12 to be tilted with respect to the body 15 in several (preferably at least eight) directions. The pointing means or pointing device 12 is provided with a button 16 which serves as "Start" and/or "Fire" button. Additional buttons 17 ("*"), 18 ("0") and 19 ("#") correspond with similar buttons of a telephone set. This will be explained in more detail later.

According to a first aspect of the invention, the pointing device 1 can be used as a substitute of the keypad of a telephone set, producing Dual Tone Multiple Frequency (hereinafter referred to as DTMF) tones in response to the handling of the device 1. It will be understood that a pointing device of this kind is much easier to use, and hence more enjoyable to play with, than the keypad of a telephone set. Yet the producing of DTMF signals allows the device to communicate via a telephone network without the aid of a computer. This aspect of the present invention will later be further explained with reference to FIG. 2.

According to a second aspect of the present invention, the pointing device allows financial transactions to be made before, during and after the playing of a game. To this end, the device 1 of the invention is provided with a card slot 14, in which a smart card 2 can be inserted. The smart card (also called IC card or chip card) is provided with an integrated circuit, the contacts 21 of which allow the exchange of data with the pointing device 1. This aspect of the present invention will later be further explained with reference to FIG. 4.

According to a third aspect of the present invention, the pointing device 1 employs a two-level protocol in order to efficiently and quickly exchange data with a support system. This aspect of the invention will later be further explained with reference to FIG. 7.

Figure 2:
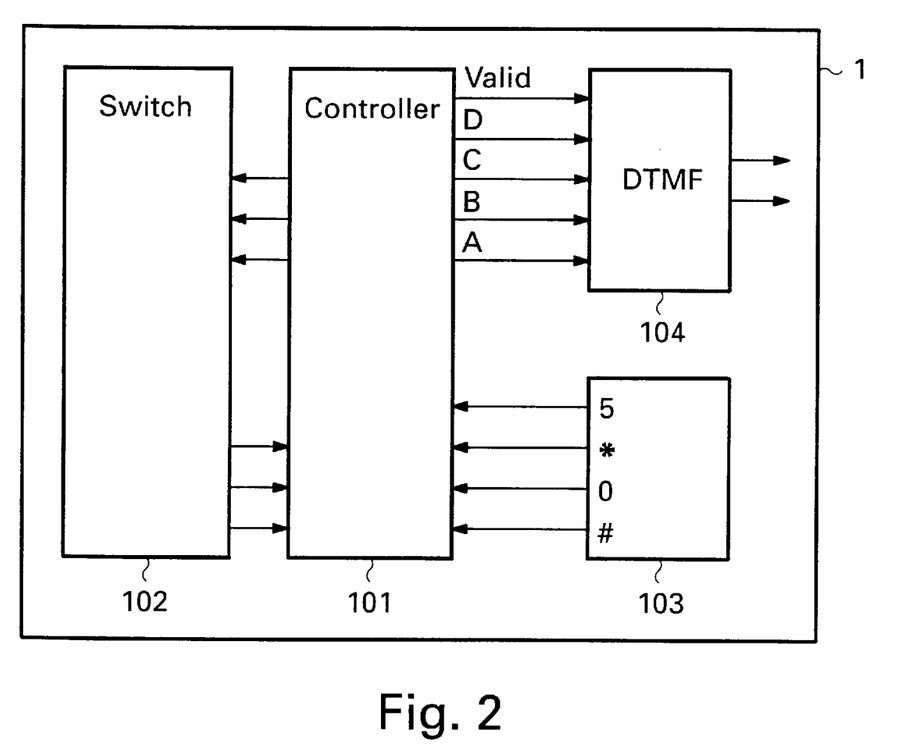
FIG. 2 shows a functional diagram of a first embodiment of the pointing device of the invention.

In FIG. 2, a first embodiment of the pointing device of the present invention is schematically shown. The device 1 comprises a control means 101, a first activating means 102, a second activating means 103, and a DTMF generator 104. The control means 101 is in the embodiment shown constituted by a microcontroller, which may be commercially available, but may also be constituted by a suitable microprocessor or microcomputer. The first activating means 102 is a switch, which is mechanically connected with the pointing means 12 shown in FIG. 1. The second activation means 103 is constituted by the buttons 16 through 19 shown in FIG. 1. The controller 101 continually scans the first activating means (switch) 102 via suitable scanning lines. The second activating means 103 produce signals which cause the controller 101 to react. In response to a movement of the pointing means 12 or the depressing of a button 16, 17, 18 or 19, the controller produces a corresponding signal which is passed to the DTMF generator 104 (it will be understood that the pointing means 12 may also be constituted by a "track ball" or the ball of a "mouse", in which case the activating means are constituted by the corresponding displacement sensors). The controller 101 may also produce a "Valid" signal indicating that the corresponding signal may be transmitted. Accordingly, the DTMF generator 104 produces DTMF tones which are transmitted to a server via a telephone line. It will be understood that the DTMF generator/receiver 104 may be replaced by another suitable interface if use is made of another communications protocol, e.g. RS232.

Figure 3:
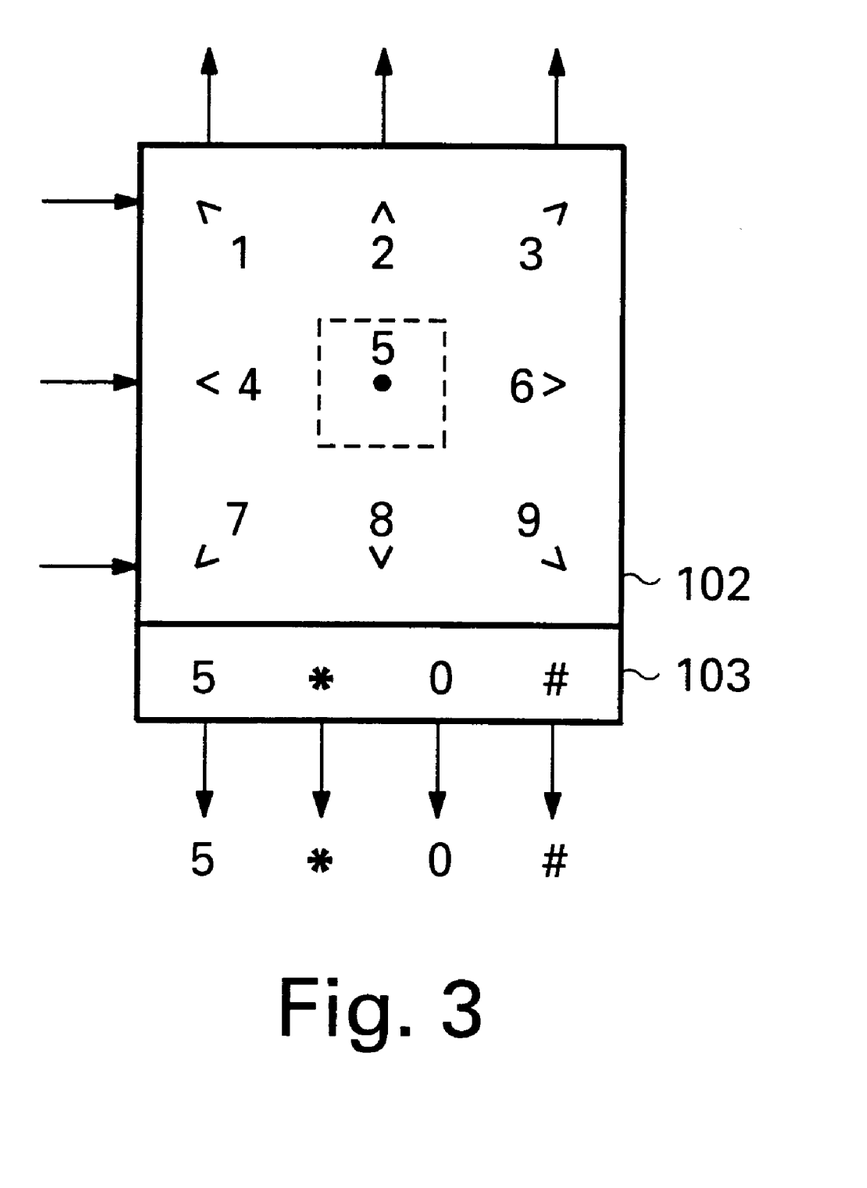
FIG. 3 schematically shows in more detail a switching means of the diagram of FIG. 2.

FIG. 3 shows the first and second activation means 102 and 103 in more detail. The first activation means 102 constitute a matrix, corresponding with the buttons 1 through 9 of the keypad of a telephone set. The device 1 thus provides a mapping of the keys of a telephone set. Each button corresponds with a direction of movement, as indicated in FIG. 3, while the button "5" corresponds with the "Fire" button (16 in FIG. 1). The switch matrix constituting the first activation means 102 is scanned using scanning lines, one line being associated with each row and each column of the matrix.

Figure 4:
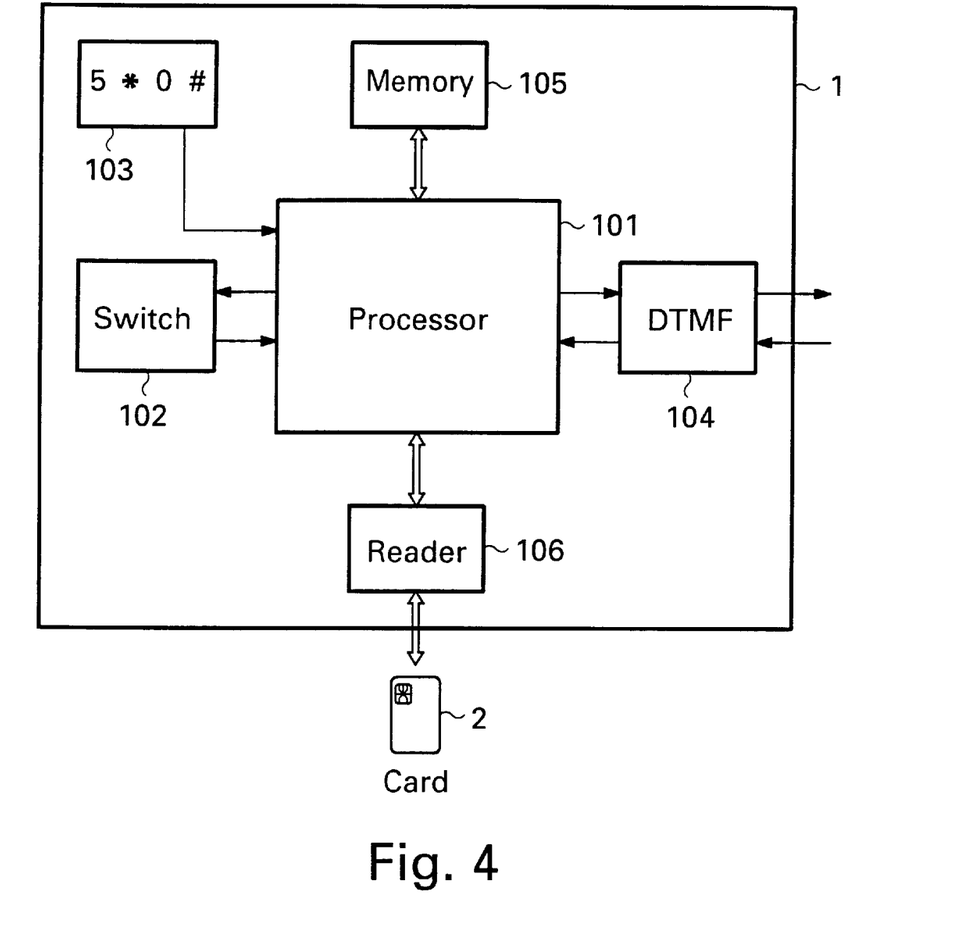
FIG. 4 shows a functional diagram of a second embodiment of the pointing device of the invention.

A second embodiment of the device 1 of the present invention is shown, by way of example, in FIG. 4. In this embodiment, the control means 101 is constituted by a microprocessor having an associated memory 105. In addition to the first and second activation means 102 and 103 and the DTMF interface 104, a card reader/writer 106 (denoted as "Reader" in FIG. 4) is connected with the control means 101. The card reader 106 allows the exchange of smart card commands and data with a smart card 2.

It should be noted that in the embodiment of FIG. 4, the DTMF interface 104 is constituted by a DTMF generator and receiver, i. e. a bidirectional device. This allows the smart card 2 to receive data. In FIG. 2 the unit 104 may only comprise a DTMF generator as the data communication of the embodiment of FIG. 2 is unidirectional.

The processor (101) performes several tasks. It scans the switch 102 and passes suitable signals to the DTMF generator 104 in response to changes in the states of the activating means 102 and 103. The processor also acts as an interface between the card reader 106 and the DTMF generator 104. In this respect, the processor 101 preferably performs a transparent protocol conversion, as will later be explained with reference to FIG. 7. The processor 101 may further perform additional control tasks, e.g. separating card data and direction data (the latter being related to the activation means). Preferably, the processor inserts a header code before each data item to be transmitted. Thus, the DTMF interface can be made to produce e.g. a DTMF code "12" indicating that the following data constitute card data and a DTMF code "13" indicating pointer (directional) data. Advantageously, the user can be asked to release the pointing means if a score is to be paid to the user, or if the user has to pay for the game. The release of the pointing means releases the communication channel to the server for the exchange of payment data.

Figure 5:
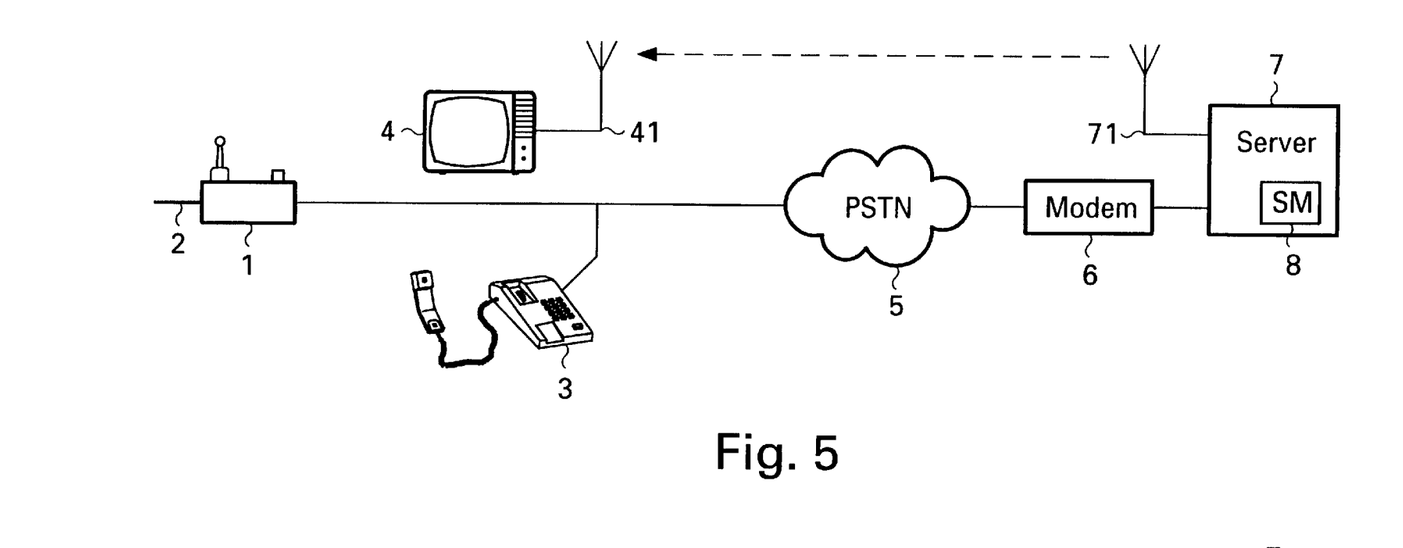
FIG. 5 shows a first embodiment of a system for remotely playing games according to the present invention.

FIG. 5 shows a first embodiment of a system enabling the remote playing of games. The system comprises a pointing device 1, which may correspond with the pointing devices 1 shown in FIGS. 1–4. The pointing device 1 preferably co-operates with a smart card 2 inserted into the pointing device 1. A telephone set 3 and the device 1 are connected via a communications line, such as a telephone subscriber line, with a communications network 5. The network 5 is in the example shown a PSTN (Public Switched Telephone Network), but may also be constituted by, e.g., a cable network suitable for transmitting DTMF signals.

A modem 6 connects a server 7 with the network 5. The modem 6, which may be a commercially available modem as used for computer communications, converts DTMF signals into a format appropriate for the server 7, and vice versa.

The server 7 may be constituted by a commercially available computer (e.g. a "personal computer") or a suitable computer system. The server preferably comprises a security module 8, denoted as "SM" in FIG. 5. The security module 8 serves to security store counter values, such as monetary balances, and to securely exchange information with a smart card 2 by using secure (cryptographic) protocols. Security modules are commercially available components. Instead of a separate (and possibly removable) security module, the functions of such a module may be performed by other components of the server (memory and processor), the security module thus being integrated in the server.

A more advanced system for effecting financial and other transactions via a communications network is described in copending U.S. patent application ser. No. 08/731,081, filed Oct. 9, 1996, incorporated by reference in this text. Said advanced system may be used in conjunction with, or in addition to, the server 7.

The server 7 of FIG. 5 is further provided with an antenna 71 for broadcasting games information to players. This information may be received at the player's end by an antenna 41 connected with a television set 4 (it will be understood that the antennas 41 and 71 may be replaced by a suitable cable network). The television set 4 displays the game as transmitted by the server. To this end, the server comprises storage means for storing games information, and processing means for running games software and broadcasting images corresponding with the game.

When a game is being played, the user influences the game by means of the pointing device 1. Direction information transmitted by the device 1 results in, e.g., movements of objects on the screen of the television set 4. Although the flow of games information is unidirectional (i.e. from the device 1 to the server 7, and from the server 7 to the television set 4), the flow of "financial" information is bidirectional, as most security protocols require the card 2 and the security module 8 to exchange information rather than to provide information unidirectionally.

Figure 6:
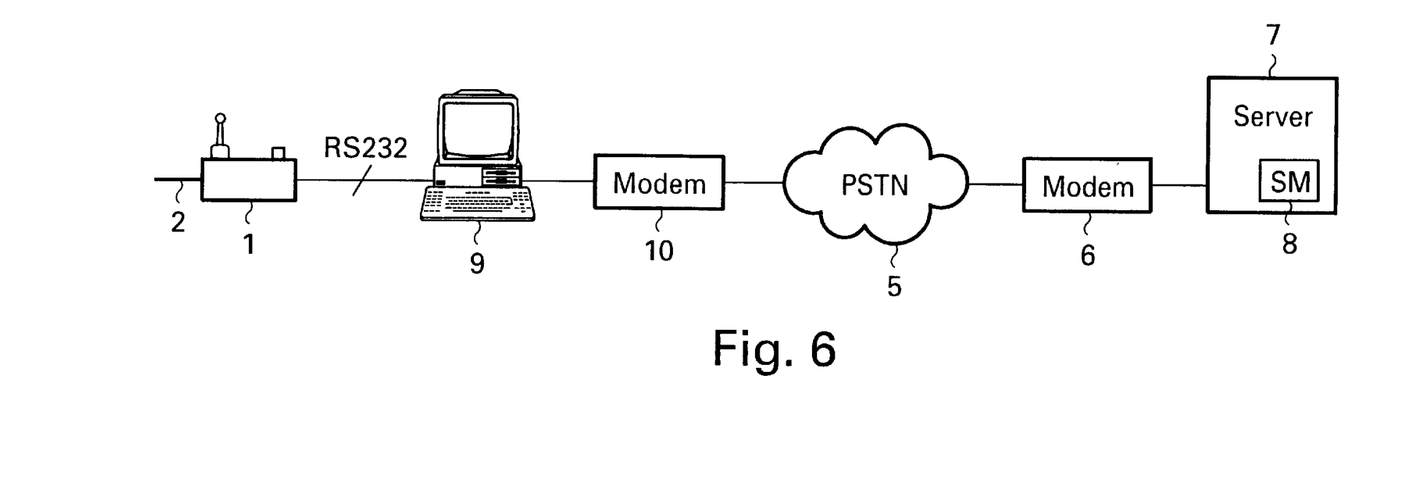
FIG. 6 shows a second embodiment of a system for remotely playing games according to the present invention.

In FIG. 6, an alternative embodiment of a system for remotely playing games is shown. The system of FIG. 6 also comprises a device 1 in which a smart card 2 may be inserted, a communications network 5, a modem 6, and a server 7 with a security module 8. Instead of a telephone set 3 and a television set 4, a computer 9 is used. A modem 10 connects the computer 9 with the network 5. The communication between the device 1 and the computer 9 may be effected by regular digital communication signals instead of by DTMF pulses. For that purpose, the DTMF interface 104 (FIGS. 2 and 4) is replaced by e.g. a RS232 interface. In the embodiment of FIG. 6, the network 5 may be a PSTN, but may also be constituted by a computer network (or group of networks), such as internet.

The systems of FIGS. 5 and 6 have been explained with reference to playing games. It will be understood that instead of games, other applications may be used, e.g. teleshopping where the shopper uses the pointing device to point at items to be purchased, a menu of items being displayed on the screen of the television set 4 or the computer 9. It should further be noted that in the case of so-called contactless smart cards the contacts 21 shown in FIG. 1 may be absent, and that such a contactless card may not have to be inserted in the device 1.

Figure 7:
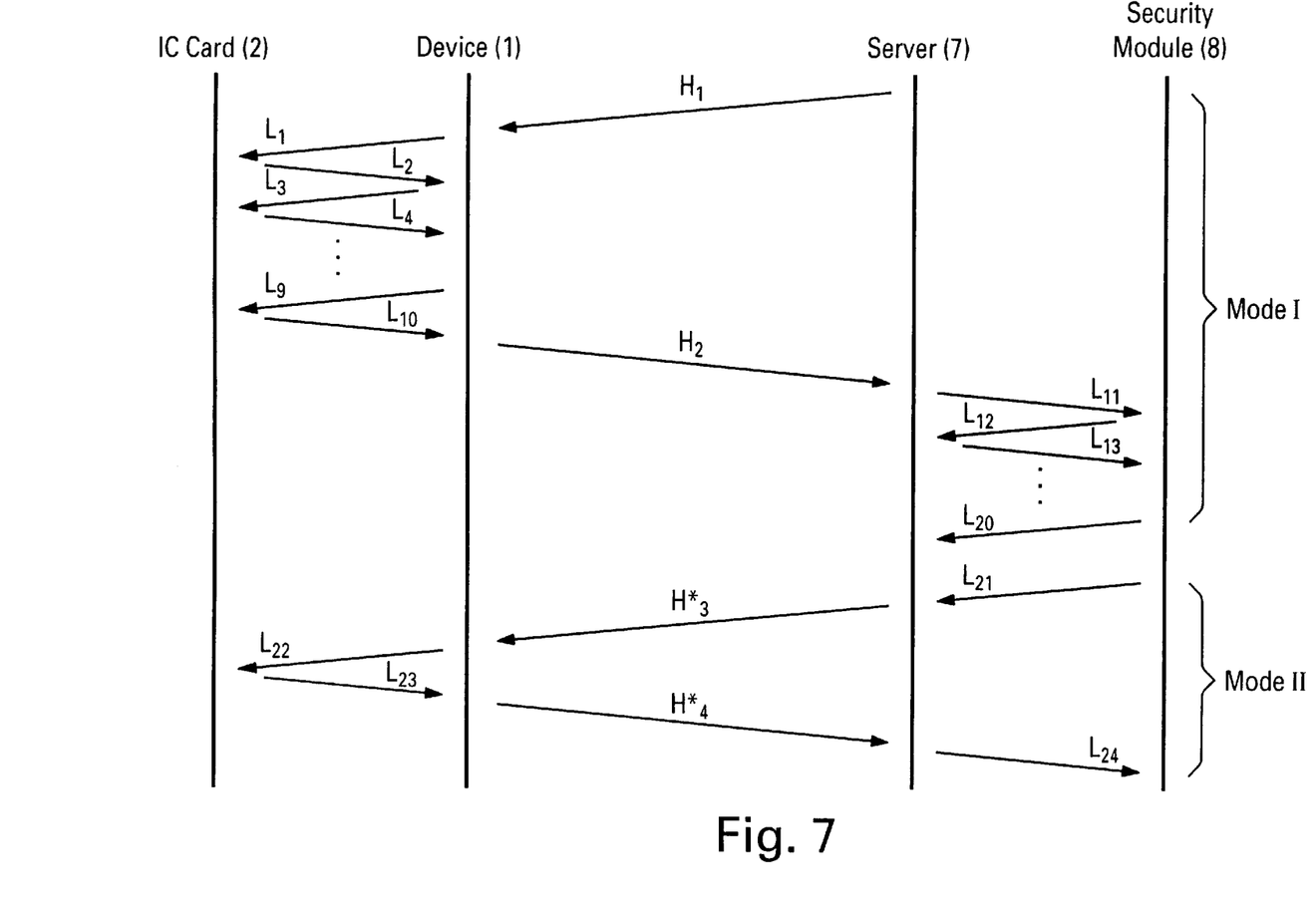
FIG. 7 diagrammatically shows the exchange of smart card commands in the system of FIG. 5.

In FIG. 7, the exchange of card data (commands and data sent to the IC card and their responses) between an IC card (smart card 2 in FIGS. 5 and 6) on the one hand and a security module 8 of the server 7 (or of a suitable transaction unit, as described in U.S. patent application Ser. No. 08/731,081), on the other hand is schematically represented. The IC card may thus correspond with the card 2 of FIG. 1, the device may correspond with the pointing device 1 of FIG. 1, the server may be the server 7 of FIGS. 5 and 6, and the security module may correspond with the security module (SM) 8 in FIGS. 5 and 6.

In accordance with the third aspect of the present invention, a distinction is made between two levels of card commands exchange. Between the IC card and the device, a low level exchange takes place: the actual card commands and card data are sent to and received from the card. As this exchange is performed using electrical signals within the device 1, the exchange can have a high data rate. Between the device and the server, however, a transmission path having a limited bandwidth is present (the telephone line and associated network between the device 1 and the modem 6). This section of the connection between IC card 2 and security module 8 usually has a limited transmission speed. For this reason, in this section a high level exchange takes place in which several low level commands are grouped together and are replaced with a single high level command. In this way, the transmission time required for a transaction can be significantly reduced. However, the content of the information transferred is not changed, resulting in a substantially transparent data transfer. This will further be explained with reference to FIG. 7.

As is shown in FIG. 7, the server 7 may issue a high level command (indicated by H). In response to the receipt of this single high level command, the device exchanges several low level commands (indicated by L) with the IC card 2. The result of this exchange is sent by the device to the server as a single high level command (H). Subsequently, this high level command results in the exchange of several low[]level commands (L) between the server and the security module. Each high level command (H) thus represents a routine comprising a plurality (e.g. five of ten) low level commands (L). Preferably, the high level commands are optimized for efficiency by e.g.having each commonly used routine represented by a single high level command.

Preferably, the device supports two different modes of data exchange. In a first mode (indicated by Mode I in FIG.

7) the device operates as described above: a high level command represents several low level commands. In a second mode (indicated by Mode II in FIG. 7) a single low level command (L) is sent as a high level command (H*) to the device, which passes the command as a low level command to the IC card. The resulting low level command (L) produced by the card is again sent by the device to the server as a high level command (H*), which subsequently converts the command back into a low level command (L). It will be understood that the high level commands H* merely convey low level commands (L). That is, the high level commands H* may e.g. consist of a low level command plus an appropriate header. In this way, low level commands may be transparently passed to the IC card while using the structure and/or data protocol of the high level commands. This transparent passing has the advantage that low level commands may be used for which no high level command is available, i.e. which cannot be grouped in an existing high level command. This is especially advantageous as the introduction of an IC card with one or more new commands does not necessitate an upgrade of the software of the device.

Preferably, the device, as well as the server, is capable of shifting back and forth between Mode I and Mode II, so that high level commands (H) representing a number of low level commands may be interspersed with high level commands (H*) merely conveying a single low level command.

The message exchange of FIG. 7 will now be explained in greater detail, using a devaluation of the smart card (i.e. a payment) as an example.

The server 7, which handles card devaluations, issues a high level command $H_1$=DEVALU(2.00, R), where 2.00 is the amount which is to be deducted from the card and R is a random number which serves to securely identify the transaction and thus to prevent fraudulent replay. This high level command $H_1$, which itself may have a length of only several bytes, causes the device 1 to exchange a series of low level messages $L_1$–$L_{10}$ with the card 2. Such messages are e.g.:

| | |
|---|---|
| $L_1$: select purse | ( <- ) |
| $L_2$: done | ( -> ) |
| $L_3$: select application | ( <- ) |
| $L_4$: done | ( -> ) |
| $L_5$: present value (2.00) | ( <- ) |
| $L_6$: done | ( -> ) |
| $L_7$: present random (R) | ( <- ) |
| $L_8$: done | ( -> ) |
| $L_9$: calculate response | ( <- ) |
| $L_{10}$: response = W | ( -> ) |

The arrows indicate the direction of a message: from the device to the card (<-) and from the card to the device (->). W is the value of the calculated response. As can be seen, the actual data (2.00 and R) of the high level command $H_1$ are not altered by the low level commands $L_5$ and $L_7$.

After receiving the response W in low level message $L_{10}$, the device sends a high level message $H_2$=RESPON(W) to the server. The actual value of W is not altered by the device.

After receiving the high level response message $H_2$, the server starts an exchange of low level messages $L_{10}$–$L_{20}$ with the security module:

| | |
|---|---|
| $L_{11}$: select SM revalue | ( -> ) |
| $L_{12}$: OK | ( <- ) |
| $L_{13}$: present value (2.00) | ( -> ) |
| $L_{14}$: OK | ( <- ) |
| $L_{15}$: present random (R) | ( -> ) |
| $L_{16}$: OK | ( <- ) |
| $L_{17}$: present response (W) | ( -> ) |
| $L_{18}$: OK | ( <- ) |
| $L_{19}$: calculate X | ( -> ) |
| $L_{20}$: OK | ( <- ) |

The arrows indicate the direction of a message: from the server to the security module (->) and from the security module to the server (<-).

As stated above, the actual content of the messages (the value, the random R and the response W) is transparently transferred, while the length of the messages exchanged between the server and the device is significantly reduced.

The use of mixed low level and high level commands will now be explained, still referring to FIG. 7. For the sake of the example, it will be assumed that the syntax of the instruction "calculate response" is changed in a new release of the smart card. In the example given above, the low level message $L_9$ will consequently produce an error message $L_{10}$: "unknown instruction". This message $L_{10}$ will then be transparently passed to the server, which may, in return, produce an appropriate instruction and send this command to the device as high level command $H^*_3$. The device subsequently transfers the command $H^*_3$ as low level command $L_{22}$ to the card, which then produces the proper response W. The response W is then sent to the security module as commands $L_{23}$, $H^*_4$ and $L_{24}$.

In this way, only a single low level command is necessary to remedy the use of an incorrect (e.g. outdated) command. Still, a significant saving in the amount of commands transferred over the network (5 in FIGS. 5 and 6) is maintained, and thus a significant saving in transmission time is achieved.

The invention thus provides a pointing device capable of the direct transmission (and reception) of DTMF signals, allowing the device to be used with a telephone line. The preferably built-in smart card reader/writer allows two-way payments to be effected while using the device for games or other purposes. The two-level protocol effectively reduces the transmission time of card data, thus freeing bandwidth of the telephone line for direction data.

It will be understood by those skilled in the art that the embodiments described above are given by way of example only and that many modifications and additions are possible without departing from the scope of the present invention.

What is claimed is:

1. Apparatus having a pointing device for generating an output signal representing directional information, wherein the pointing device comprises:

a pointing element for generating a first pointing signal in response to user input;

a signal generating device generating a second pointing signal in response to the first pointing signal, the signal generating device comprising:

a first activation device mechanically connected with the pointing device and generating a first signal;

a second activation device mechanically connected with the pointing device and including at least one key, the second activation device generating a second signal;

a card reader/writer configured to exchange card data with a smart card; and a control device electrically coupled to the first and second activation devices, the control device generating said second pointing signal in response to the first and second signals;

wherein the signal generating device is configured to produce a first code indicating that subsequent data represents said card data and a second code indicating that the subsequent data represents said directional information; and an interface, electrically coupled to the signal generating device, the interface generating the output signal in response to the second pointing signal generated by the signal generating device.

2. Apparatus having a pointing device for generating an output signal representing directional information, wherein the pointing device comprises:

a pointing element for generating a first pointing signal in response to user input;

a signal generating device generating a second pointing signal in response to the first pointing signal, the signal generating device comprising:

a first activation device mechanically connected with the pointing device and generating a first signal;

a second activation device mechanically connected with the pointing device and including at least one key, the second activation device generating a second signal;

a card reader/writer configured to exchange card data with a smart card; and a control device electrically coupled to the first and second activation devices, the control device generating said second pointing signal in response to the first and second signals;

wherein the signal generating device communicates with a server using a first command type and with a smart card using a second command type, wherein each command of the first type and each command of the second command type contains corresponding card data and each of said commands of the first command type represents at least one of said commands of the second command type; and an interface, electrically coupled to the signal generating device, the interface generating the output signal in response to the second pointing signal generated by the signal generating device.

3. The apparatus set forth in claim 2, in which the first signal comprises switch information.

4. The apparatus set forth in claim 2, in which the first command type represents a plurality of the corresponding second command type.

5. A method comprising the steps of:

generating a first pointing signal in response to user input;

generating a first signal representing switch information;

generating a second signal representing selection information; and generating said second pointing signal in response to the first and second signals and the first pointing signal;

generating output signals in response to the second pointing signal, wherein the output signals correspond to keys of the keypad of a telephone set, each distinct one of the output signals corresponding to a distinct key of the keypad; and communicating with a server using a first command type and with a smart card using a second command type, wherein each command of the first type and each command of the second command type contains corresponding card data, and each of said commands of the first command type represents at least one of said commands of the second command type.

6. The method recited in claim 5, wherein each one of the commands of the first command type represents a plurality of corresponding ones of the commands of the second command type.

* * * * *